(12) United States Patent
Yamashiroya

(10) Patent No.: US 6,470,425 B1
(45) Date of Patent: Oct. 22, 2002

(54) CACHE LINE REPLACEMENT THRESHOLD BASED ON SEQUENTIAL HITS OR MISSES

(75) Inventor: Atsushi Yamashiroya, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/551,398

(22) Filed: Apr. 17, 2000

(30) Foreign Application Priority Data

May 26, 1999  (JP) ............................................. 11-146457

(51) Int. Cl.[7] ............................................. G06F 12/12
(52) U.S. Cl. ........................ 711/133; 711/134; 711/136
(58) Field of Search ................................. 711/133, 159, 711/136, 160, 134

(56) References Cited

U.S. PATENT DOCUMENTS 5,043,885 A * 8/1991 Robinson .................... 711/133
5,499,354 A * 3/1996 Aschoff et al. ............. 711/129
5,608,890 A * 3/1997 Berger et al. ............... 711/113
5,619,676 A * 4/1997 Fukuda et al. .............. 711/137
5,627,990 A * 5/1997 Cord et al. .................. 711/122
5,694,572 A * 12/1997 Ryan ........................... 711/118

FOREIGN PATENT DOCUMENTS

JP   1-191959   8/1989
JP   3-232036   10/1991

* cited by examiner

Primary Examiner—B. James Peikari
(74) Attorney, Agent, or Firm—McGinn & Gibb, PLLC

(57) ABSTRACT

A cache memory having a plurality of entries includes a hit/miss counter checks a cache hit or a cache miss on each of the plurality of entries, and a write controller which controls an inhibition of a replacement of each of the plurality of entries based on the result of a check made by the hit/miss counter.

5 Claims, 7 Drawing Sheets

CACHE LINE REPLACEMENT THRESHOLD BASED ON SEQUENTIAL HITS OR MISSES

BACKGROUND OF THE INVENTION

The present invention relates to cache memory, and more particularly to cache memory in which frequently accessed data is not replaced.

In computer systems with cache memory, data which is stored in the cache memory is often replaced by new data. In a direct mapping protocol, a unique entry is provided for each index address. Therefore, there is a high probability that a plurality of different addresses are associated with the same entry (line) in cache memory. Alternatively, in the set associative protocol, a plurality of entries are provided for each index address. Even in this protocol, however, there is still a probability that access to different addresses results in the replacement of data existing in the cache memory. When a cache miss occurs and new data is stored in cache memory, an algorithm, such as the LRU (Least Recently Used) algorithm, is used to select an entry to be replaced.

As described above, when there is no free entry, a cache miss that occurs in conventional cache memory automatically brings new data therein and replaces existing data. This means that, in some cases, new data is stored in cache memory even if it is rarely used and that frequently used data is replaced by such rarely used data. Also, a casual access to data sometimes replaces frequently accessed data. A program that executes processing with a frequently used work area in cache memory may receive an interrupt during the processing. In this case, an entry in the work area may be rewritten.

SUMMARY OF THE INVENTION

It is an object of the present invention to provide cache memory that inhibits frequently used data from being replaced and thereby to speed up overall system processing.

In one preferred embodiment, a cache memory according to the present invention has a plurality of entries, including a hit/miss counter checking a cache hit or a cache miss on each of the plurality of entries, and a write controller controlling an inhibition of a replacement of each of the plurality of entries based on a result of the checking made by the hit/miss counter.

BRIEF DESCRIPTION OF THE DRAWINGS

An embodiment of the present invention will be understood more fully from the detailed description given here below and from the accompanying drawings of a preferred embodiment of the invention, which.

DESCRIPTION OF THE PREFERRED EMBODIMENTS

An embodiment of the present invention will be described in detail by referring to the attached drawings.

Figure 1:
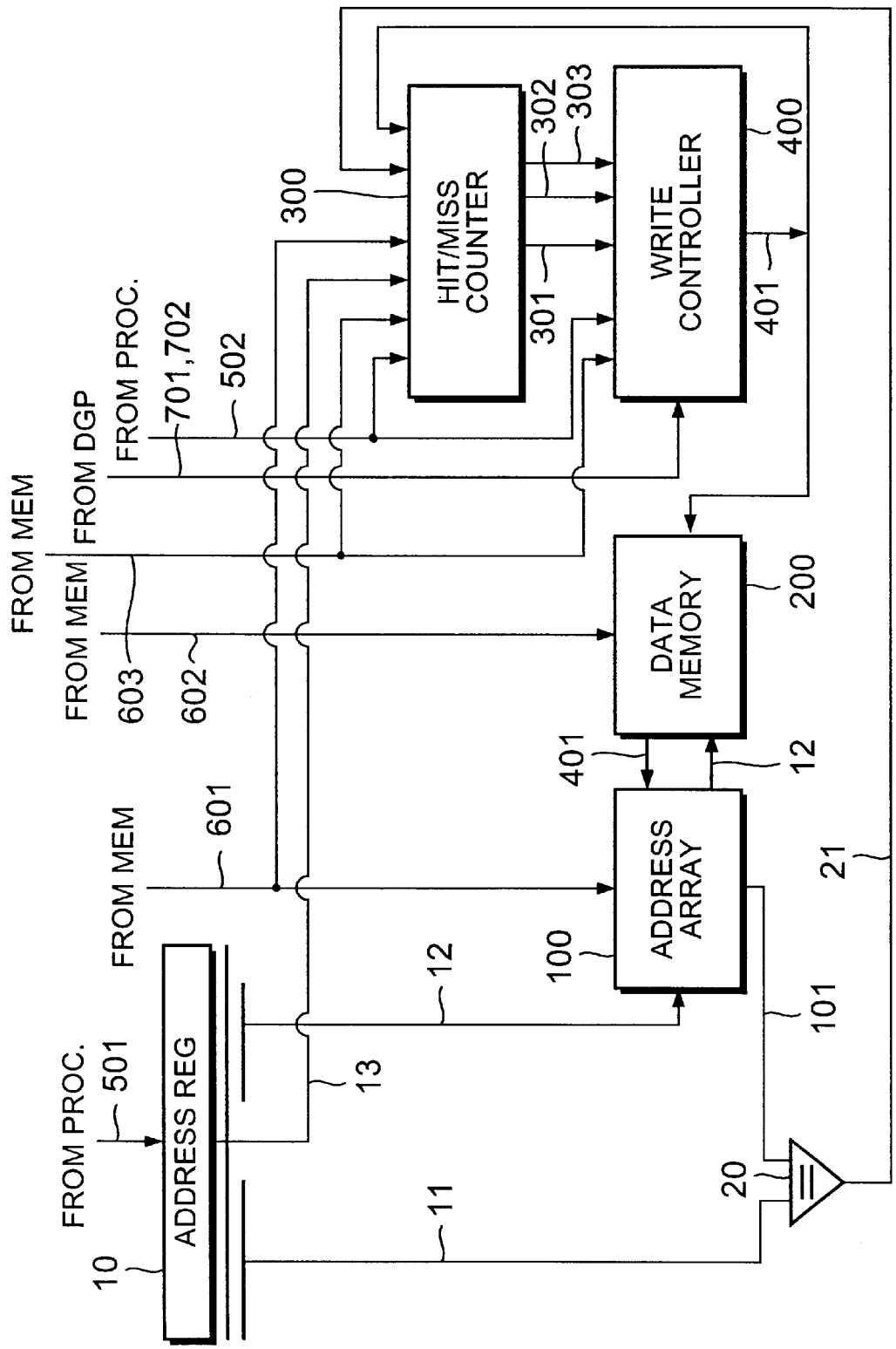
FIG. 1 is a block diagram showing the overall configuration of an embodiment of cache memory according to the present invention.

Like a standard cache memory, the embodiment of cache memory according to the present invention comprises an address array 100, a data memory 200, and a comparator 20, as shown in FIG. 1. An address sent from a processor (not shown in the figure) via a signal line 501 is stored in an address register 10. The address 100 holds address tags. The address 100 is indexed by an index address 12 of the address stored in the address register 10. An address tag read from the address array 100 is output to the comparator 20 via an address tag line 101. The comparator 20 compares the address tag sent via the address tag line 101 with an tag 11 of the address stored in the address register 10 and outputs the comparison result to a signal line 21. As with the address array 100, the data memory 200 is indexed by the index address 12 of the address stored in the address register 10.

When the comparison result of the comparator 20 indicates that a cache hit has occurred, data read from the data memory 200 is used as valid data. Conversely, when the comparison result of the comparator 20 indicates that a cache miss has occurred, a data transfer request is sent to memory (not shown in the figure). In response to this data transfer request, the fill address and the fill data associated with the cache miss are sent to the address array 100 and the data memory 200, respectively, via signal lines 601 and 602.

Referring to FIG. 1, the embodiment of cache memory according to the present invention further includes a hit/miss counter 300 and a write controller 400. The hit/miss counter 300 counts the number of times a cache hit or a cache miss occurs sequentially for each entry of the cache memory. The write controller 400 determines whether to replace data in the cache memory according to the number of sequential cache hits or cache misses.

In the description of the embodiment, it is assumed that the direct mapping protocol is used. Note that the present invention applies also to the set associative protocol.

Figure 2:
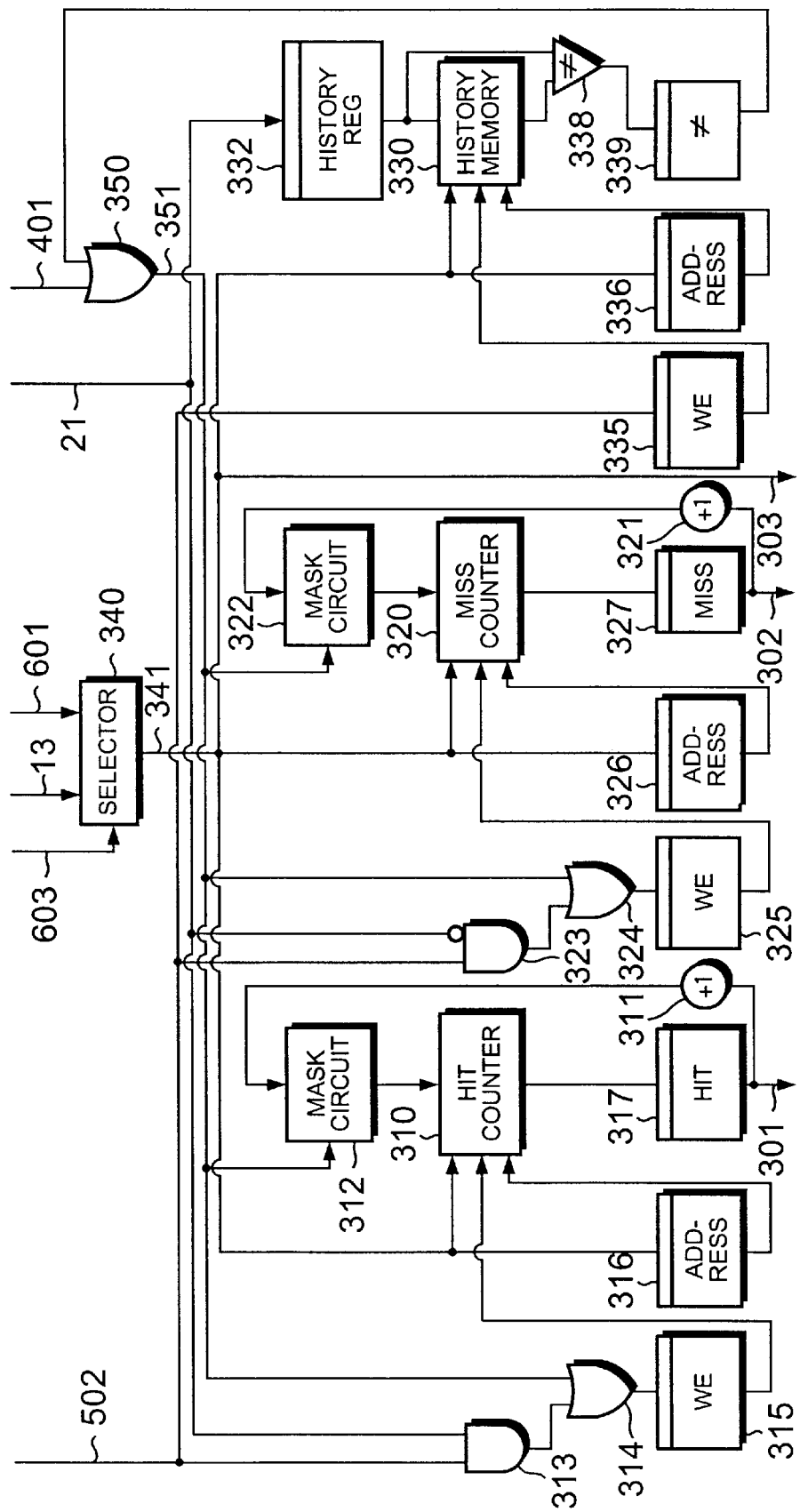
FIG. 2 is a diagram showing the configuration of a hit/miss counter in the embodiment of the present invention.

Referring to FIG. 2, the hit/miss counter 300 comprises a hit counter 310, a miss counter 320, and a history memory 330. The hit counter 310, miss counter 320, and history memory 330 each have the same number of entries as the address array 100. Each entry contains a value associated with a corresponding entry of the address array 100. Each entry of the hit counter 310 contains the number of times a cache hit occurred sequentially. Each entry of the miss counter 320 contains the number of times a cache miss occurred sequentially. Each entry of the history memory 330 contains history data indicating whether a cache hit or a cache miss occurred the last time the entry was accessed.

The hit/miss counter 300 receives a cache memory access address 13 from the processor at cache access time, and the fill address 601 from a memory at cache miss time. Depending upon an identification signal 603, a selector 340 selects the fill address 601 when the fill operation is executed and, in other cases, the cache memory access address 13. It then outputs the selected address to a signal line 341. The address sent via the signal line 341 is used to read data from the hit counter 310, miss counter 320, and history memory 330. In addition, the address is once stored in address registers 316, 326, and 336 for uses as a write address for updating the hit counter 310, miss counter 320, and history memory 330.

The output from the hit counter 310 and the miss counter 320 is stored in a hit register 317 and a miss register 327 and then added to adders 311 and 321, respectively. The output from the adders 311 and 321 is sent to the hit counter 310 and the miss counter 320, respectively, via mask circuits 312 and 322. As will be described later, if the condition described later is satisfied, the mask circuits 312 and 322 output "zero"; otherwise, they output the received value unchanged.

Write enable registers 315, 325, and 335 each hold a write enable signal for the hit counter 310, miss counter 320, and history memory 330. For example, when the write enable register 315 indicates a "write enable" state, the hit counter 310 writes the output of the mask circuit 312 into the entry corresponding to the address indicated by the address register 316. When a signal line 502 indicates that the processor has issued a cache read request and when the signal line 21 indicates that a cache hit has occurred, a logical circuit 313 detects this fact. In response to this detection, the write enable register 315 holds the "write enable" state. Similarly, when the signal line 502 indicates that the processor has issued a cache read request and when the signal line 21 indicates that a cache miss has occurred, a logical circuit 323 detects this fact. In response to this detection, the write enable register 325 holds the "write enable" state. When the signal line 502 indicates that the processor has issued a cache read request, the write enable register 335 holds the "write enable" state.

If an entry was accessed before, a comparator 338 checks if two sequential hits or two sequential misses have occurred for the entry. A mismatch register 339 contains the result of this checking.

A logical circuit 350 generates the logical sum of the output of the mismatch register 339 and the value of a signal line 401. As will be described later, the signal line 401 is used by the write controller 400 to send the write enable signal to the address array 100 and the data memory 200. Therefore, when the signal line 401 indicates a "cache update" or when the mismatch register 339 indicates a "mismatch", the logical circuit 350 activates a signal line 351. When the signal line 351 is activated, the output of the mask circuits 312 and 322 becomes "zero". When the signal line 351 is activated, the "write enable" state is also set in the write enable registers 315 and 325 via logical sum circuits 314 and 324, respectively.

The values of the hit register 317 and the miss register 327 are output to the write controller 400 via signal lines 301 and 302, respectively. The output 341 of the selector 340 is also sent to the write controller 400 via a signal line 303.

Figure 3:
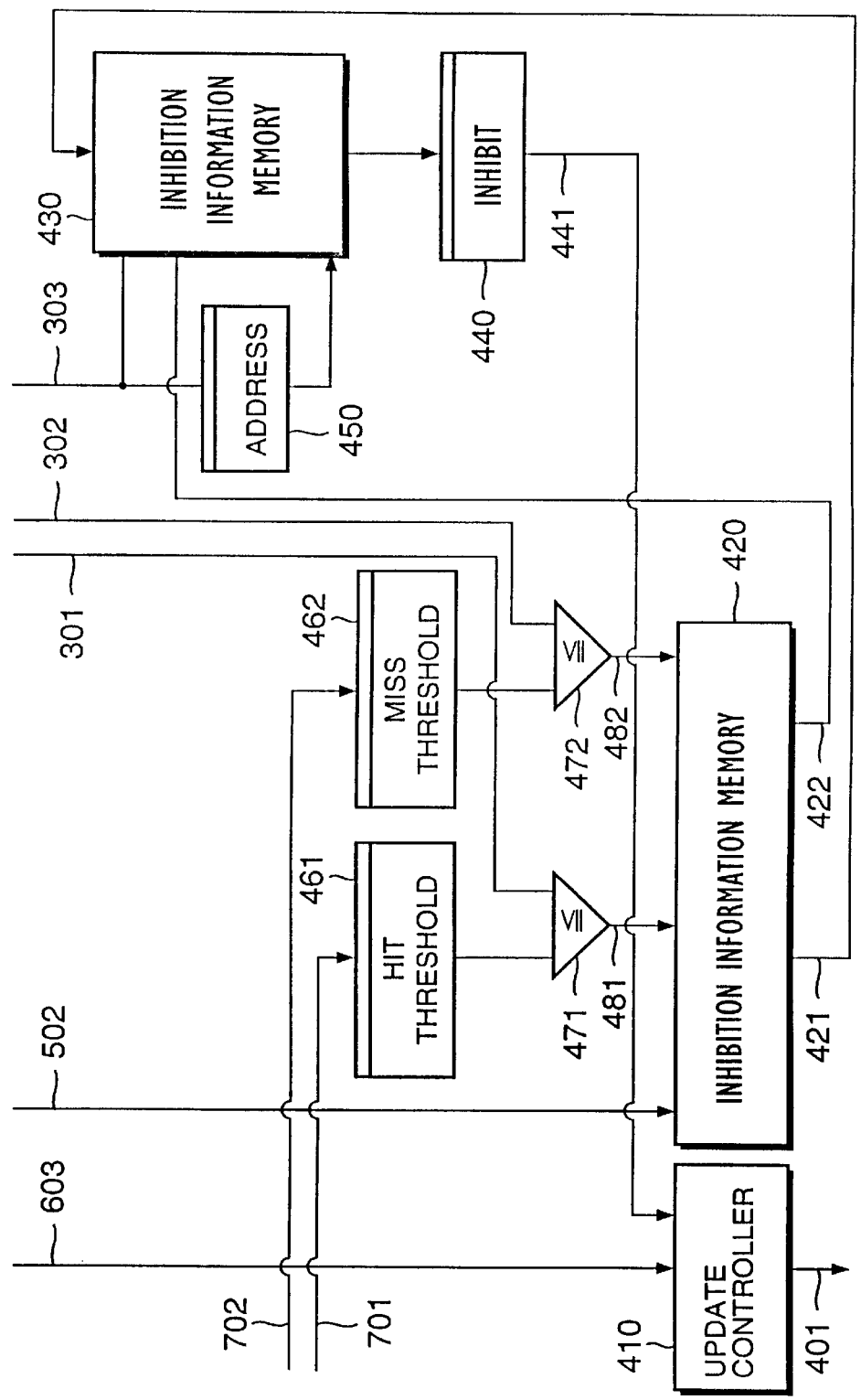
FIG. 3 is a diagram showing the configuration of a write controller in the embodiment of the present invention.

Referring to FIG. 3, the write controller 400 comprises a inhibition information memory 430. The inhibition information memory" 430 has the same number of entries as the address array 100, with each entry indicating whether or not the update of the corresponding entry of the address array 100 is inhibited. The inhibition information memory 430 uses, as a read address, the address 303 sent from the hit/miss counter 300. The address 303 is also stored in an address register 450 for use as a write address. A value read from the inhibition information memory 430 is once stored in a inhibit information register 440 and then sent to an update controller 410 via a signal line 441. The contents to be written into the inhibition information memory 430 and the timing in which they are to be written are given by a inhibition information memory controller 420 via signal lines 421 and 422, respectively.

The write controller 400 further comprises a hit threshold register 461 and a miss threshold register 462. The hit threshold register 461 contains the number of sequential cache hits that is used as an update inhibition condition for a cache memory entry. That is, when the number of sequential cache hits on an entry exceeds the number of times specified in the hit threshold register 461, the update of the entry is inhibited thereafter. Similarly, the miss threshold register 462 contains the number of sequential cache misses that is used as an update inhibition release condition for a cache memory entry. That is, when the number of sequential cache misses on an entry exceeds the number of times specified in the miss threshold register 462, the inhibition of update of the entry is released thereafter even if the update of the entry is inhibited up to that time. The hit threshold register 461 and the miss threshold register 462 are set by a diagnostic processor (not shown in the figure) via signal lines 701 and 702. The hit threshold register 461 and the miss threshold register 462 may be defined as software-visible registers to allow them to be set directly from within the program.

A comparator 471 compares the value of the hit threshold register 461 with the number of hits sent via the signal line 301. That is, if the number of hits sent via the signal line 301 is equal to or larger than the value of the hit threshold register 461, the comparator (sequential hit detector) 471 activates a signal line 481. Similarly, a comparator 472 compares the value of the miss threshold register 462 with the number of misses sent via the signal line 302. That is, if the number of misses sent via the signal line 302 is equal to or larger than the value of the miss threshold register 462, the comparator (sequential miss detector) 472 activates a signal line 482.

Figure 4:
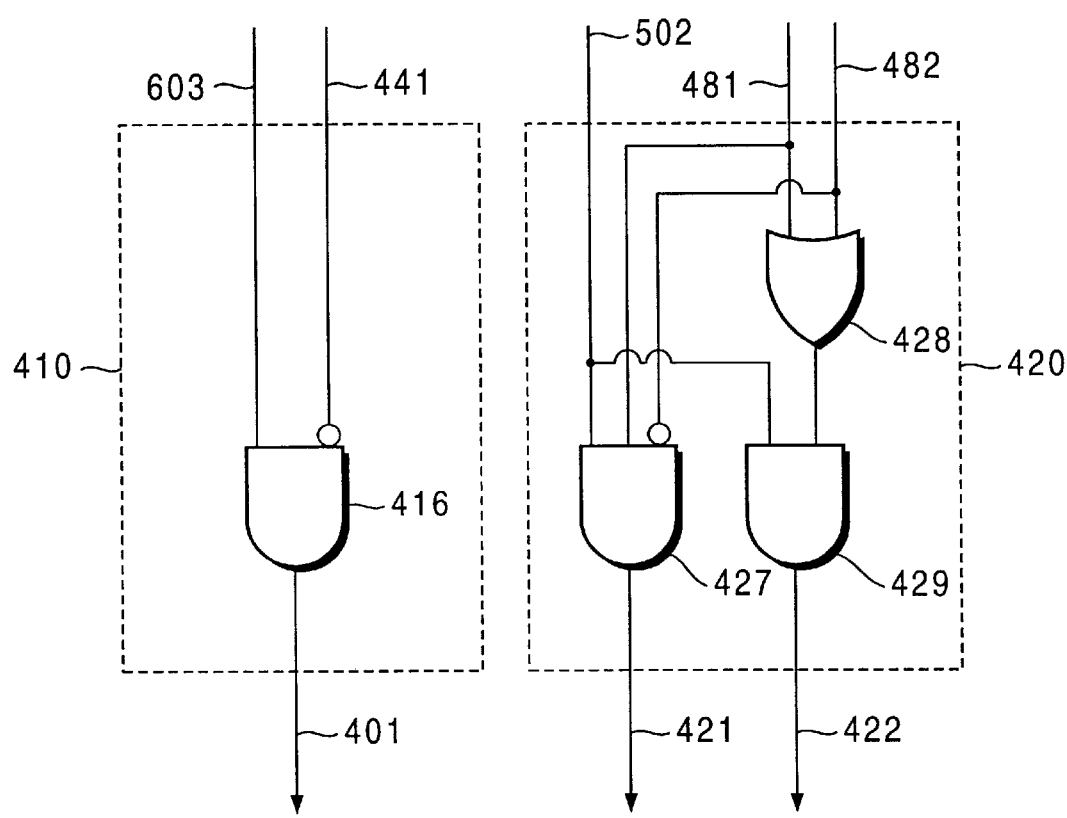
FIG. 4 is a diagram showing the configuration of an update controller and a inhibition information memory controller in the embodiment of the present invention.

Referring to FIG. 4, a logical product circuit 416 of the update controller 410 receives the inverted value of the protect signal 441 sent from the inhibition information memory 430 and the identification signal 603 sent from the memory to generate their logical product. That is, if the fill operation caused by a cache miss is in operation and if the corresponding entry in the cache memory is not "protect", the signal line 401 indicates the "cache memory update enable" state. Otherwise, the signal line 401 indicates the "cache memory update disable" state.

A inhibition information memory controller 420 generates the contents to be written into the inhibition information memory 430 with the use of a logical circuit 427, and outputs the generated contents to the signal line 421. That is, if the signal line 481 indicates that the hit threshold has been exceeded, if the signal line 482 indicates that the miss threshold is not exceeded, and if the signal line 502 indicates that the processor has issued a cache read request, then the logical circuit 427 outputs the "protect state" to the signal line 421 as the contents to be output to the inhibition information memory 430. Conversely, if these conditions are not satisfied, the logical circuit 427 outputs the "non-protect state" to the signal line 421 as the contents 421 to be written into the inhibition information memory 430.

The inhibition information memory controller 420 also generates the timing signal, which indicates when to write into the inhibition information memory 430, with the use of a logical sum circuit 428 and a logical product circuit 429, and outputs the generated signal to the signal line 422. That is, if one of the signal lines 481 and 482 indicates that the threshold has been exceeded and if the signal line 502 indicates that the processor has issued a cache read request, then the logical product circuit 429 activates the signal line 422 to request that the contents be written into the inhibition information memory 430.

Next, the operation of the embodiment according to the present invention will be described with reference to the drawings.

Figure 5:
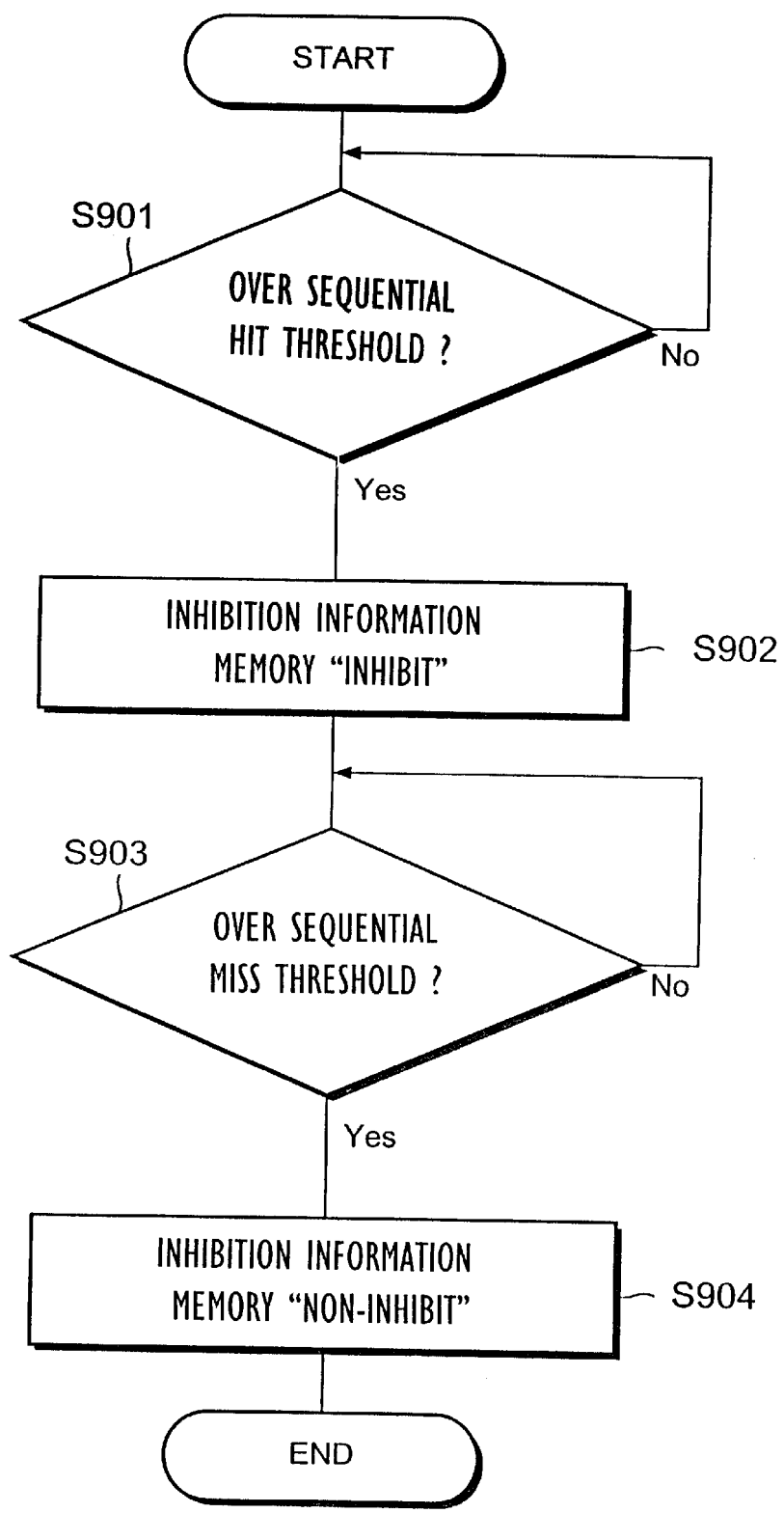
FIG. 5 is a flowchart showing the operation of the embodiment of the present invention.

Referring to FIG. 5, if the number of sequential cache hits on an entry has exceeded the value set in the hit threshold register 461 (step S901), the "protect state" is set in the corresponding entry of the inhibition information memory 430 to inhibit the corresponding cache entry from being replaced thereafter (step S902).

If the number of sequential cache misses on a replacement-inhibited entry has exceeded the value set in the miss threshold register 462 (step S903), the "non-protect state" is set in the corresponding entry of the inhibition information memory 430 to release the replacement inhibition of the corresponding cache entry (step S904).

As will be described later, the value stored in the hit counter 310 and the miss counter 320 actually means the "sequential number of times-1". For example, the number of times of 3, if set in the hit threshold register 461, means that "the entry will be protected if the number of sequential cache hits has exceeded 3 (that is, 4 or more times)". In this case, the comparator 471 detects a sequential hit condition when the hit counter 310 has reached 3 (that is, sequential 4 cache hits).

Next, some examples of operation of the embodiment according to the present invention will be described with reference to the drawings.

Figure 6:
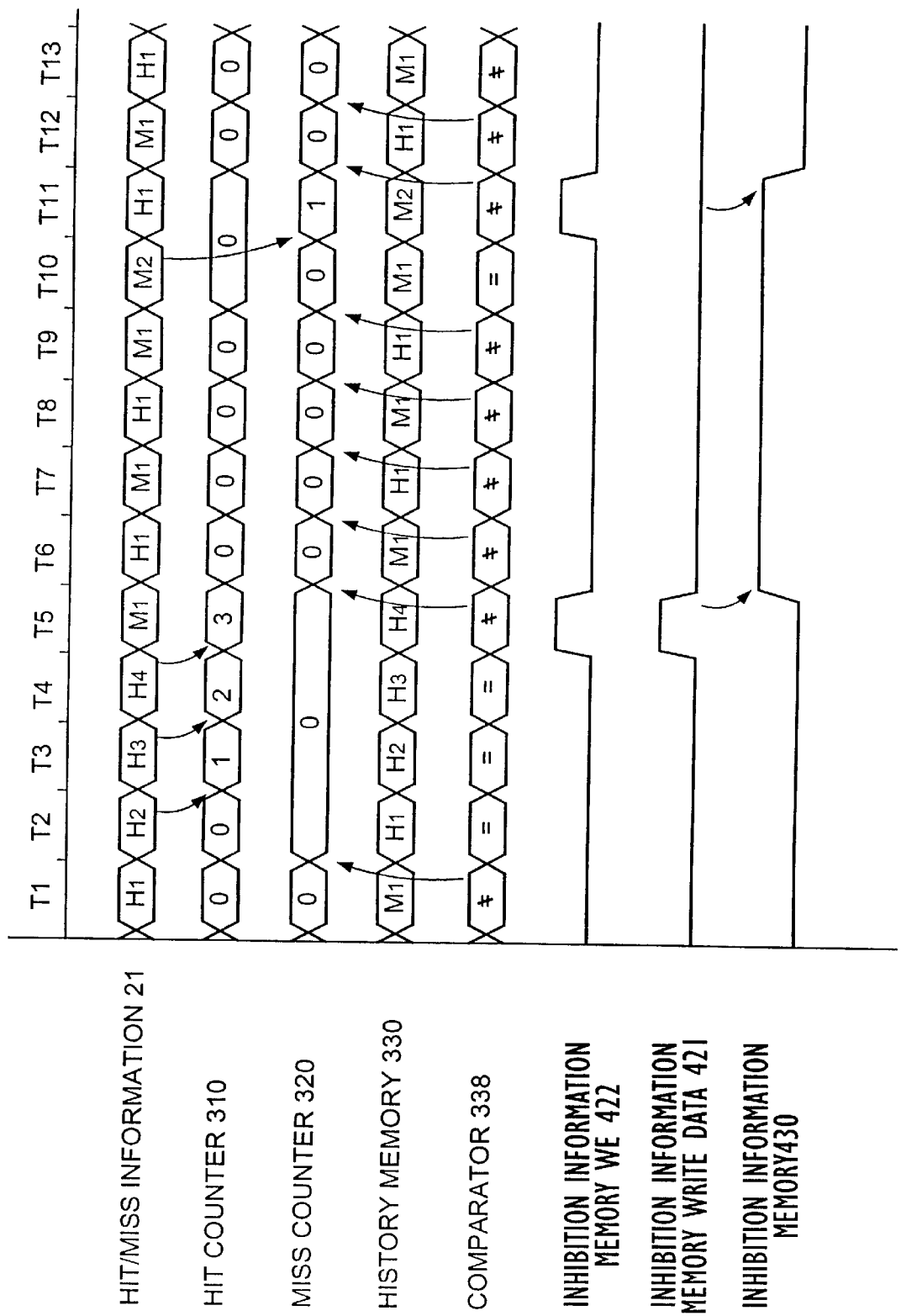
FIG. 6 is a diagram showing the first example of operation in the embodiment of the present invention.

In the first example, assume that the value of 3 is set in the hit threshold register 461 and that the value of 1 is set in the miss threshold register 462 (FIG. 6). FIG. 6 is a timing diagram showing the operation and data when only the same address is accessed sequentially.

Referring to FIG. 6, when a cache hit occurs in cycle T1 and a cache miss occurred in the immediately preceding cycle, the comparator 338 outputs "mismatch". This causes the hit counter 310 and the miss counter 320 to be reset to 0.

The second sequential cache hit occurs in cycle T2 and so the hit counter 310 increments to 1. Similarly, the third sequential cache hit occurs in cycle T3 and so the 310 increments to 2. The fourth sequential cache hit occurs in cycle T4 and so the hit counter 310 increments to 3. At this time, the value of the hit counter 310 matches the value of 3 stored in the hit threshold register 461. This activates, in cycle T5, the signal line 422 that indicates the timing in which the entry in the inhibition information memory 430 is to be written and, at the same time, changes the signal line 421 to 1, that is, the "protect". From cycle T6, the corresponding entry of the inhibition information memory" 430 indicates the "protect state".

In cycle T5, a cache miss occurs, and the comparator 338 indicates a "mismatch". This resets both the hit counter 310 and the miss counter 320 to 0. After that, a cache hit and a cache miss alternate in cycles T6–T9. Each alteration causes the comparator 338 to indicate a "mismatch", thus resetting the values of the hit counter 310 and the miss counter 320 to 0.

The second sequential cache miss occurs in cycle T10 and so the miss counter 320 increments to 1. The value matches the value of 1 in the miss threshold register 462. This activates, in cycle T11, the signal line 422 that indicates the timing in which the entry in the inhibition information memory 430 is to be written and, at the same time, changes the signal line 421 to 0, that is, the "non-protect state". Therefore, beginning in cycle T12, the entry of inhibition information memory 430 indicates the "non-protect state" again.

Because the value of 3 is set in the hit threshold register 461 in the first example as described above, the update of the entry is inhibited beginning in cycle T4 in which the fourth sequential hit occurs. Also, because the value of 1 is set in the miss threshold register 462, the update of the entry is still inhibited even when the first cache miss occurs. On the other hand, beginning in cycle T10 in which the second sequential cache miss occurs, the update of the entry is enabled again.

Note that when the value of 1 is set in the miss threshold register 462 as in the first example, a flag memory may be used, instead of the miss counter 320, to indicate whether or not a cache miss has occurred.

Figure 7:
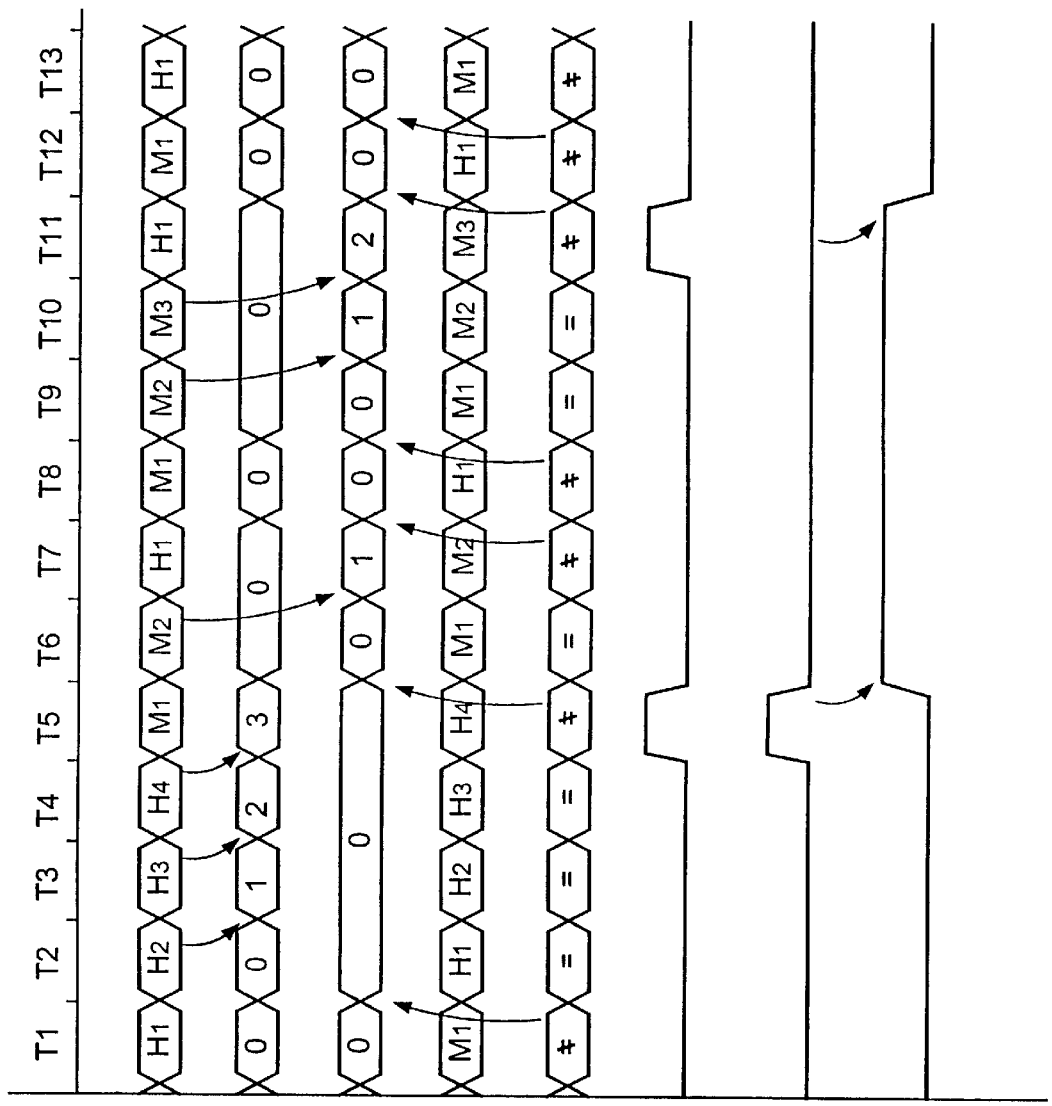
FIG. 7 is a diagram showing the second example of operation in the embodiment of the present invention.

The following describes the second example in which the value of 3 is set in the hit threshold register 461 and the value of 2 is set in the miss threshold register 462 (FIG. 7).

Referring to FIG. 7, the timing chart for cycles 1–5 is the same as that of the timing chart shown in FIG. 6. Beginning in cycle T6, the entry of the inhibition information memory 430 indicates the "protect state".

The second sequential cache miss occurs in cycle T6 and so the miss counter 320 increments to 1. Because the miss threshold is not exceeded, the entry of the inhibition information memory 430 still contains the "inhibit state". Then, a cache hit occurs in cycle T7, followed by a series of cache misses. The third sequential cache miss occurs in cycle T10. This activates the signal line 422 that indicates the timing in which the entry in the inhibition information memory 430 is to be written and, at the same time, changes the signal line 421 to 0, that is, the "non-inhibit state". Thus, beginning in cycle T12, the entry of the inhibition information memory 430 indicates the "non-inhibit state" again.

As described above, because the value of 2 is set in the miss threshold register 462 in the second example, the update of the entry remains inhibited even when the second sequential cache miss occurs. The update of the entry is enabled again beginning in cycle T10 in which the third sequential cache miss occurs.

As described above, when the number of sequential cache hits on an entry exceeds the number of times that is set in the hit threshold register 461, the corresponding entry of the inhibition information memory 430 indicates the "inhibit state" and therefore the replacement of the corresponding entry of the cache memory is inhibited. On the other hand, when the number of sequential cache misses on an entry exceeds the number of times that is set in the miss threshold register 462, the corresponding entry of the inhibition information memory 430 indicates the "non-inhibit state". Therefore, the inhibition of the replacement of the corresponding entry of the cache memory is released. This cache memory thus prevents a frequently accessed, contiguously-hit entry from being replaced.

It is apparent, from the above description, that the present invention prevents frequently-accessed data from being replaced in cache memory and therefore improves the overall system performance.

What is claimed is:

1. A cache memory having a plurality of entries, comprising:
   a hit/miss counter checking a cache hit or a cache miss on each of said plurality of entries; and
   a write controller controlling an inhibition of a replacement of each of said plurality of entries based on a result of the checking made by said hit/miss counter,
   wherein said hit/miss counter comprises a hit counter counting a number of sequential cache hits on each of said plurality of entries,
   wherein said write controller inhibits the replacement of each of said plurality of entries based on the number in said hit counter, wherein said write controller comprises:
a hit threshold register in which the number of sequential cache hits is set as a condition for inhibiting the replacement of each of said plurality of entries; and
a sequential hit detector detecting that the number of sequential cache hits has exceeded the number stored in the hit threshold register, and
wherein when said sequential hit detector detects that the number of sequential hits has exceeded the number stored in said hit threshold register, the replacement of a corresponding entry of said plurality of entries is inhibited.

2. A cache memory having a plurality of entries, comprising:
a hit/miss counter checking a cache hit or a cache miss on each of said plurality of entries; and
a write controller controlling an inhibition of a replacement of each of said plurality of entries based on a result of the checking made by said hit/miss counter,
wherein said hit/miss counter comprises a hit counter counting a number of sequential cache hits on each of said plurality of entries,
wherein said write controller inhibits the replacement of each of said plurality of entries based on the number in said hit counter,
wherein said hit/miss counter further comprises a miss counter counting a number of sequential cache misses on each of said plurality of entries, and
wherein said write controller releases the inhibition of the replacement of each of said plurality of entries based on the number in said miss counter.

3. The cache memory according to claim 2, wherein said write controller further comprises:
a miss threshold register in which the number of sequential cache misses is set as a condition for releasing the inhibition of the replacement of each of said plurality of entries; and
a sequential miss detector detecting that the number of sequential cache misses has exceeded the number stored in the miss threshold register,
wherein when said sequential miss detector detects that the number of sequential misses has exceeded the number stored in said miss threshold register, the inhibition of the replacement of a corresponding entry of said plurality of entries is released.

4. A cache memory having a plurality of entries, comprising:
a hit/miss counter checking a cache hit or a cache miss on each of said plurality of entries, said hit/miss counter including a hit counter counting a number of sequential cache hits on each of said plurality of entries; and
a write controller controlling an inhibition of a replacement of each of said plurality of entries based on a result of the checking made by said hit/miss counter, said write controller inhibiting the replacement of each of said plurality of entries based on the number in said hit counter,
wherein said write controller comprises:
a hit threshold register in which the number of sequential cache hits is set as a condition for inhibiting the replacement of each of said plurality of entries;
a sequential hit detector detecting that the number of sequential cache hits has exceeded the number stored in the hit threshold register;
a miss threshold register in which the number of sequential cache misses is set as a condition for releasing the inhibition of the replacement of each of said plurality of entries;
a sequential miss detector detecting that the number of sequential cache misses has exceeded the number stored in the miss threshold register; and
an inhibition information memory storing therein protect information indicating whether or not the replacement of each of said plurality of entries is enabled,
wherein when said sequential hit detector detects that the number of sequential hits has exceeded the number stored in said hit threshold register, corresponding information in said inhibition information memory is set to a protect state and wherein, when the sequential miss detector detects that the number of sequential misses has exceeded the number stored in said miss threshold register, the corresponding information in said inhibition information memory is set to a non-protect state.

5. A controller for cache memory having a plurality of entries, comprising:
a hit/miss counter checking a cache hit or a cache miss on each of said plurality of entries; and
a write controller controlling an inhibition of a replacement of each of said plurality of entries based on a result of the checking made by the hit/miss counter,
wherein said hit/miss counter comprises:
a hit counter counting a number of sequential cache hits on each of said plurality of entries; and
a miss counter counting a number of sequential cache misses on each of said plurality of entries, and
wherein when a value of said hit counter exceeds a first predetermined value, said write controller inhibits the replacement of a corresponding entry of said plurality of entries and, when a value of said miss counter exceeds a second predetermined value, releases the inhibition of the replacement of the corresponding entry of said plurality of entries.

* * * * *